United States Patent
Yaginuma (10) Patent No.: US 11,915,091 B2
(45) Date of Patent: Feb. 27, 2024

(54) WIRELESS TAG COMMUNICATION DEVICE

(71) Applicant: TOSHIBA TEC KABUSHIKI KAISHA, Tokyo (JP)

(72) Inventor: Jun Yaginuma, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/889,862

(22) Filed: Aug. 17, 2022

(65) Prior Publication Data

US 2023/0143107 A1 May 11, 2023

(30) Foreign Application Priority Data

Nov. 8, 2021 (JP) .................................. 2021-181835

(51) Int. Cl.
*G06K 7/10* (2006.01)
*G06K 7/14* (2006.01)
*H04B 17/318* (2015.01)

(52) U.S. Cl.
CPC ....... *G06K 7/1095* (2013.01); *G06K 7/10099* (2013.01); *G06K 7/10386* (2013.01); *G06K 7/1443* (2013.01); *H04B 17/318* (2015.01)

(58) Field of Classification Search
CPC ............. G06K 7/1095; G06K 7/10099; G06K 7/10386; G06K 7/1443; H04B 17/318
See application file for complete search history.

(56) References Cited

U.S. PATENT DOCUMENTS

| 9,087,245 | B2 * | 7/2015 | Murakami | ......... G06K 7/10099 |
| 2014/0203916 | A1 | 7/2014 | Sano et al. | |
| 2017/0201674 | A1 * | 7/2017 | Yamamoto | ........... H04N 23/635 |
| 2018/0003812 | A1 | 1/2018 | Kamiya | |

FOREIGN PATENT DOCUMENTS

JP 2014142722 A * 8/2014

* cited by examiner

*Primary Examiner* — Seung H Lee
(74) *Attorney, Agent, or Firm* — FOLEY & LARDNER LLP (57) ABSTRACT

A wireless tag communication device includes a directional antenna, a communication control circuit configured to communicate with a wireless tag through the directional antenna, a camera positioned such that a direction along which a signal strength of the directional antenna is maximized and a shooting direction of the camera coincide with each other, and a controller. The controller is configured to estimate a tag direction where the wireless tag exists, estimate a position of the wireless tag communication device, estimate a position of the wireless tag based on the estimated tag direction and the estimated position of the wireless tag communication device, and control a display to display a first image captured by the camera and a second image showing an explicit area containing the estimated position of the wireless tag.

20 Claims, 6 Drawing Sheets

WIRELESS TAG COMMUNICATION DEVICE

CROSS-REFERENCE TO RELATED APPLICATION

This application is based upon and claims the benefit of priority from Japanese Patent Application No. 2021-181835, filed on Nov. 8, 2021, the entire contents of which are incorporated herein by reference.

FIELD

Embodiments described herein relate generally to a wireless tag communication device.

BACKGROUND

In the related art, there is a wireless tag communication device for reading a radio frequency identification (RFID) tag (hereinafter, also referred to as a wireless tag) at an unspecified position. The wireless tag communication device communicates with a specific RFID tag while an operator changes the orientation of the antenna. The wireless tag communication device estimates the direction where the specific RFID tag exists based on the communication state with the specific RFID tag. The wireless tag communication device of the related art notifies the operator of the direction where the RFID tag exists by displaying a guidance screen including an estimation result of the direction where the RFID tag exists on a display.

The operator searches for the RFID tag or an article with the RFID tag attached while moving in the direction indicated on the display. However, it is necessary for the operator to be accustomed to actually finding the RFID tag by relying on the direction where the RFID tag exists displayed on the guidance screen displayed by the wireless tag communication device of the related art. The wireless tag communication device is desired to display the position where the RFID tag exists in an intuitively easy-to-recognize manner so that the operator can easily find the RFID tag.

DETAILED DESCRIPTION

Embodiments of the present disclosure provide a wireless tag communication device capable of displaying an intuitive, easy-to-understand guide to an operator.

In general, according to one embodiment, a wireless tag communication device includes a directional antenna, a communication control circuit, a camera, and a controller. The communication control circuit is configured to communicate with a wireless tag through the directional antenna. The camera is positioned such that a direction along which a signal strength of the directional antenna is maximized and a shooting direction of the camera coincide with each other. The controller estimates a tag direction where the wireless tag exists, estimates a position of the wireless tag communication device, estimates a position where the wireless tag exists based on the estimated tag direction and the estimated position of the wireless tag communication device, and controls a display to display a first image captured by the camera and a second image showing an explicit area containing the estimated position of the wireless tag.

Figure 1:
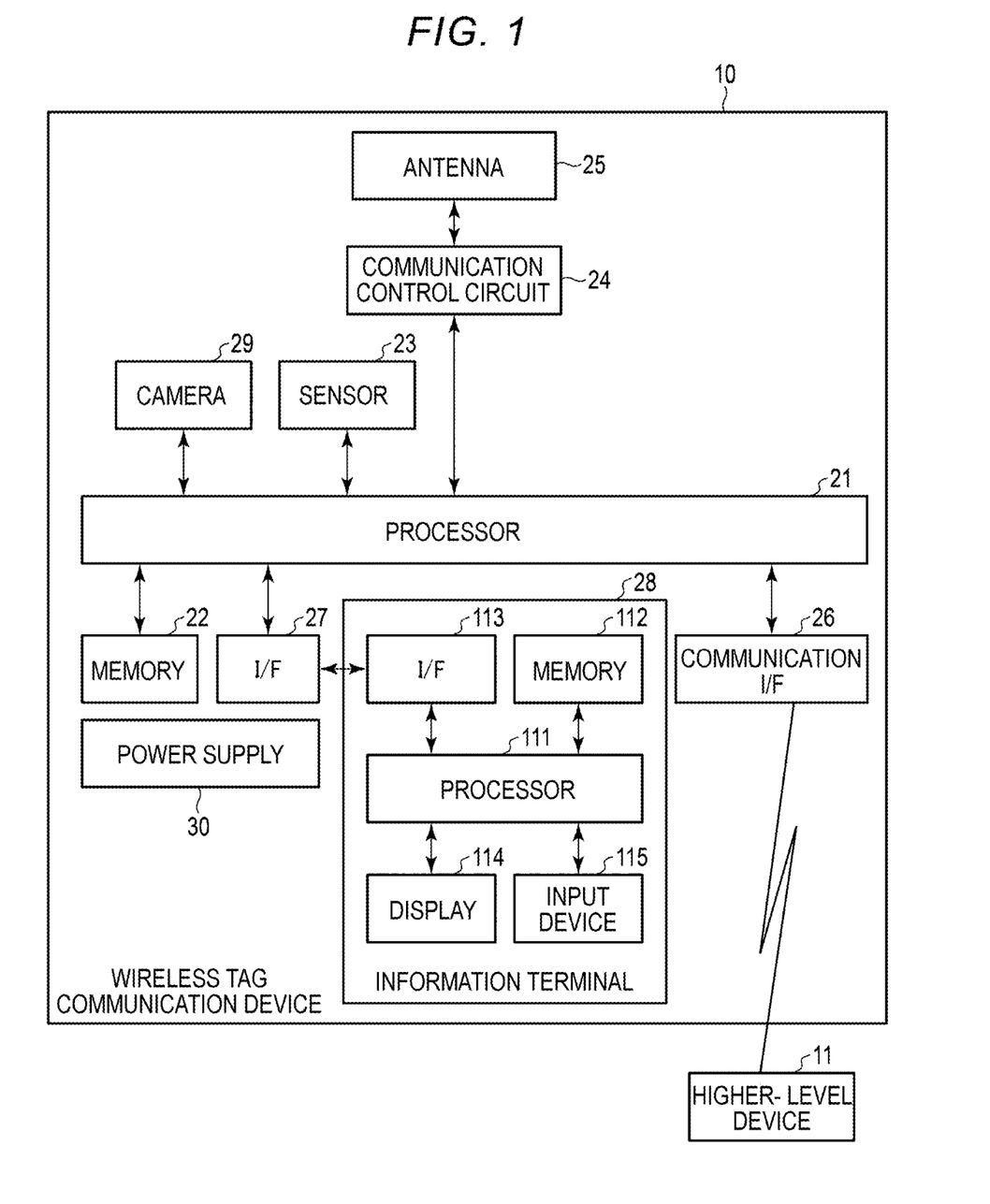
FIG. 1 is a block diagram schematically showing a configuration example of a control system for a wireless tag communication device according to an embodiment.

Hereinafter, embodiments will be described with reference to the drawings. First, the configuration of a wireless tag communication device 10 (e.g., a wireless tag reading device, a wireless tag reader) according to the embodiment will be described. FIG. 1 is a block diagram schematically showing a configuration example of the wireless tag communication device 10 according to the embodiment. The wireless tag communication device 10 according to the embodiment is a device that communicates with an RFID tag (e.g., a wireless tag). The wireless tag communication device 10 is a wireless tag reading device that reads tag information and the like recorded on the RFID tag by communicating with the RFID tag. The wireless tag communication device 10 estimates information regarding a position, such as the direction where the RFID tag exists (e.g., a direction of the RFID tag relative to the wireless tag communication device 10), from the reading result of the RFID tag. The wireless tag communication device 10 displays an image indicating the estimated position where the RFID tag exists (e.g., an estimated position of the RFID tag) on a display 114.

The RFID tag is a wireless communication device that operates using a radio wave (e.g., output signal) from the wireless tag communication device 10. The RFID tag includes a processor, a memory, a communication circuit, and an antenna. The RFID tag outputs (e.g., provides) a response signal including tag information recorded in its own memory in response to a read command from the wireless tag communication device 10. For example, the RFID tag is attached to an article such as a commodity or a component. For the RFID tag attached to an article, tag information including information for identifying the article is recorded in the internal memory.

An operator operates the wireless tag communication device 10 according to the embodiment. The wireless tag communication device 10 is a device that changes the orientation of an antenna 25 (e.g., a directional antenna) used for communication with the RFID tag by the operation of the operator. For example, the wireless tag communication device 10 is a handy type device that is operated by an operator by hand. Further, the wireless tag communication device 10 may be mounted on a moving body in which the operator controls the orientation of the antenna.

The wireless tag communication device 10 according to the embodiment reads an RFID tag attached to an article while an operator changes the position and orientation of the wireless tag communication device 10. The wireless tag communication device 10 reads the tag information recorded on the RFID tag by receiving a response signal from the RFID tag existing in the reading range. The wireless tag communication device 10 also acquires information such as a received signal strength indicator (RSSI) value and a phase value detected from the response signal from the RFID tag. The wireless tag communication device 10 stores information such as the RSSI value and the phase value together with the tag information as a reading result of the RFID tag.

For example, the wireless tag communication device 10 operates as a search device for searching for an article attached with an RFID tag in a predetermined area such as a warehouse or a store. The wireless tag communication device 10 as a search device continuously reads the RFID tag to be searched while the operator changes the position and orientation of the wireless tag communication device 10.

The wireless tag communication device 10 estimates the direction (e.g., a tag direction) in which the RFID tag exists based on the wireless communication with the RFID tag to be searched. Further, the wireless tag communication device 10 estimates the position of the wireless tag communication device 10 (e.g., the position of the own device) based on the image captured by the camera 29 and the information detected by a sensor 23. Further, the wireless tag communication device 10 estimates the position where the RFID tag exists based on the estimation result of the tag direction in time series and the estimation result of the position of the own device. The wireless tag communication device 10 displays the estimated RFID tag position on the display 114 as an image that can be intuitively recognized by the operator.

In the configuration example shown in FIG. 1, the wireless tag communication device 10 includes a processor 21, a memory 22, the camera 29, a communication control circuit 24, the antenna 25, a communication interface (I/F) 26, an interface 27, an information terminal 28, the sensor 23, and a power supply 30.

The processor 21 controls each part. The processor 21 includes, for example, an arithmetic circuit such as a CPU. The processor 21 executes a program to control each part and perform various data processing. Further, the processor 21 may be provided with an internal memory. The processor 21 executes various processes by executing a program stored in the memory 22 or the like. Together, the processor 21 and the memory 22 may act as a controller of the wireless tag communication device 10.

The memory 22 includes various memories. For example, the memory 22 includes memories such as ROM, RAM, and NVM. The ROM is a non-volatile memory that cannot be rewritten. The ROM stores a program or the like executed by the processor 21. The RAM is a volatile memory that temporarily stores data. The RAM operates as working memory or buffer memory. The NVM is a rewritable non-volatile memory. The NVM stores information such as control information, setting information, and processing results.

Further, the NVM of the memory 22 stores various programs for the processor 21 to execute each process described herein. For example, the memory 22 stores a program that executes a process of estimating a tag position. Further, the memory 22 stores a program that executes a process of estimating the tag direction and a program that executes a process of estimating the position of the own device in relation to the tag position estimation process. The memory 22 stores a program for executing a display process for displaying a guidance screen corresponding to the tag position on a display 114. Further, the memory 22 stores a program for executing an image process (e.g., a process of generating a second image) indicating an explicit area according to the tag position in relation to the display process of the guidance screen.

The sensor 23 (e.g., a movement sensor) detects the movement of the wireless tag communication device 10. For example, the sensor 23 is an acceleration sensor, a gyro sensor, a geomagnetic (direction) sensor, or the like. The sensor 23 may be configured to include multiple types of sensors. The sensor 23 may be configured to be included in the information terminal 28 or may include a sensor included in the information terminal 28.

The communication control circuit 24 (e.g., a communication interface) and the antenna 25 form an RFID interface that communicates with the RFID tag. The communication control circuit 24 includes a control circuit for communicating with the RFID tag via the antenna 25. The communication control circuit 24 transmits a transmission signal (e.g., a radio wave) supplied from the processor 21 from the antenna 25 with a set output value. The antenna 25 outputs the transmission signal supplied from the communication control circuit 24 as a radio wave that can be received by the RFID tag.

The communication control circuit 24 not only outputs the transmission signal to the antenna 25 but also supplies the signal received by the antenna 25 to the processor 21 as reception data. The antenna 25 receives the response signal from the RFID tag and the communication control circuit 24 processes the response signal (e.g., a reception signal) received by the antenna 25, and supplies the processed response signal to the processor 21. For example, the communication control circuit 24 supplies the tag information included in the reception signal from the RFID tag and the RSSI value and the phase value indicating the strength of the reception signal to the processor 21.

The communication I/F 26 is an interface for communicating with an external device. The communication I/F 26 may be a communication interface for communicating with a higher-level device 11 such as a server. The communication I/F 26 may be an interface for wired communication or an interface for wireless communication.

The interface 27 is an interface for connecting to the information terminal 28. The interface 27 may be any one corresponding to an interface provided in the information terminal 28. For example, the interface 27 may be one that physically contacts and connects to the interface included in the information terminal 28, such as a Universal Serial Bus (USB) interface or a local area network (LAN) interface.

Further, the interface 27 may be a wireless communication connection such as a Bluetooth (registered trademark) interface or a WiFi interface.

The information terminal 28 is a device including the display 114, an input device 115, and the like. The information terminal 28 is a user interface that outputs information presented to the operator and inputs information instructed by the operator. The information terminal 28 may be, for example, a portable information processing device such as a smartphone or a tablet PC.

In the configuration example shown in FIG. 1, the information terminal 28 includes a processor 111, a memory 112, an interface (I/F) 113, the display 114, the input device 115, and the like. The processor 111 controls each part, processes data, and the like. The processor 111 is, for example, a CPU. The processor 111 implements various operations by executing a program stored in the memory 112. Together, the processor 111 and the memory 112 may act as a controller of the information terminal 28.

The interface 113 is an interface (e.g., a second communication interface) for communicating with the processor 21. The interface 113 may be any one corresponding to the interface 27. For example, the interface 113 is an interface such as LAN, USB, Bluetooth (registered trademark), or WiFi.

The display 114 is a device that displays information. For example, the display 114 displays the detection result of the RFID tag (for example, the position of the RFID tag). The input device 115 is a device for an operator to input an operation instruction or the like. The display 114 and the input device 115 are configured as, for example, a display device with a touch panel.

The camera 29 captures an image. The camera 29 captures an image in the communication range (e.g., reading range) of the antenna 25 with the RFID tag. The camera 29 captures an image whose shooting direction is the direction in which the directivity of the antenna 25 is maximized (e.g., a direction along which a signal strength of the antenna is maximized). The camera 29 is provided (e.g., positioned) in the wireless tag communication device 10 so that the optical axis in the shooting direction coincides with the axis in the direction in which the directivity of the antenna 25 is maximized (e.g., an image captured by the camera contains an area where the signal strength of the antenna is maximized). For example, assuming that the direction in which the directivity of the antenna 25 is maximized is the orientation of the antenna 25, the camera 29 is configured so that the shooting direction coincides with the orientation of the directional antenna.

The power supply 30 supplies power for operating the wireless tag communication device 10. The power supply 30 supplies electric power for the operation to each part of the wireless tag communication device 10. In the handheld type wireless tag communication device 10, the power supply 30 is composed of, for example, a rechargeable battery.

Next, a configuration example of the communication control circuit 24 and the antenna 25 in the wireless tag communication device 10 according to the embodiment will be described in detail. The communication control circuit 24 includes a modulation circuit, an amplifier circuit on the transmitting side, a coupler, an amplifier circuit on the receiving side, a demodulation circuit, an output setting circuit, a level detection circuit, and the like. The antenna 25 is connected to the coupler in the communication control circuit 24. The antenna 25 transmits and receives radio waves for communication with the RFID tag. The communication control circuit 24 processes a signal transmitted to the RFID tag and a signal received from the RFID tag via the antenna 25 (e.g., the communication control circuit 24 communicates with the RFID tag through the antenna 25).

The modulation circuit modulates the waveform signal (e.g., a carrier wave) with the input transmission data. The amplifier circuit on the transmitting side amplifies the output signal of the modulation circuit. The coupler supplies the output signal of the amplifier circuit on the transmitting side to the antenna 25. With these configurations, the communication control circuit 24 outputs a carrier wave modulated by transmission data from the antenna 25.

The RFID tag receives the radio waves as the transmission signal transmitted from the antenna 25. The RFID tag recognizes, for example, a read command included in the transmission signal transmitted from the antenna 25. If the RFID tag recognizes the read command, the RFID tag outputs data (e.g., tag information) stored in its own memory by radio waves, for example, by backscatter modulation.

The antenna 25 receives the radio waves as the reception signal output by the RFID tag. The communication control circuit 24 acquires the reception signal received by the antenna 25 by the coupler and supplies the acquired reception signal to the amplifier circuit on the receiving side. The amplifier circuit on the receiving side amplifies the reception signal received by the antenna 25. The demodulation circuit demodulates the data (e.g., tag information) included in the reception signal amplified by the amplifier circuit on the receiving side.

The antenna 25 has directivity (e.g., is a directional antenna). The antenna 25 is, for example, a planar antenna. However, the antenna 25 is not limited to a specific configuration. The antenna 25 is arranged to transmit an electromagnetic wave toward a communication region (e.g., a reading region) centered on a direction in which the directivity is maximized (for example, direction a shown in FIG. 2, a directional along which a signal strength of the directional antenna is maximized). The wireless tag communication device 10 is configured so that the direction in which the directivity of the antenna 25 is maximized is the front.

Further, the communication control circuit 24 sets the strength (e.g., output value) of the signal output by the output setting circuit. The amplifier circuit on the transmitting side amplifies the signal supplied from the modulation circuit so as to have an output value set by the output setting circuit. The antenna 25 transmits an output signal (e.g., a radio wave) having an output value set by the output setting circuit which is supplied from the amplifier circuit on the transmitting side via the coupler.

The communication control circuit 24 detects the strength of the signal input to the amplifier circuit on the receiving side by the level detection circuit. In the amplifier circuit on the receiving side, the reception signal received by the antenna 25 is input via the coupler. The communication control circuit 24 detects information for specifying the RSSI value indicating the strength of the reception signal (e.g., a response signal from the RFID tag) received by the antenna 25 by the level detection circuit.

Figure 2:
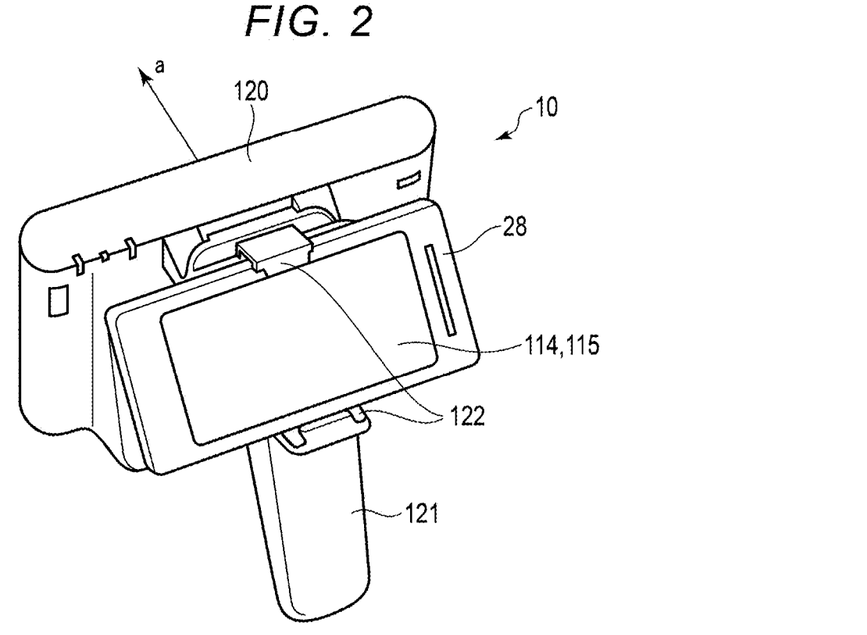
FIG. 2 is an external view showing a configuration example of the appearance of the wireless tag communication device.

Next, the configuration of the appearance of the wireless tag communication device 10 according to the embodiment will be described. FIG. 2 is a diagram showing a configuration example of the appearance of the wireless tag communication device 10 according to the embodiment. The wireless tag communication device 10 shown in FIG. 2 is a handheld type device operated by an operator while being gripped (e.g., by the operator's hand). The wireless tag communication device 10 shown in FIG. 2 is operated as, for example, a search device for searching for an RFID tag or an article to which an RFID tag is attached.

In the configuration example shown in FIG. 2, the wireless tag communication device 10 is configured to be operated in a state where the information terminal 28 is set in the reader device 120 (e.g., a base device, a base portion). The reader device 120 is a device containing each component shown in FIG. 1 other than the information terminal 28. The reader device 120 includes a housing or chassis in which the antenna 25 is installed. For example, in the reader device 120, the antenna 25 is provided so that the directivity (e.g., signal strength) is the strongest in the direction of the arrow a shown in FIG. 2. Here, it is assumed that the direction of the arrow a is the front (i.e., forward) direction of the wireless tag communication device 10. Further, it is assumed that the front direction of the wireless tag communication device 10 is the orientation of the antenna 25.

The reader device 120 includes a grip portion 121 (e.g., a grip, a handle, an interface portion) and a holding portion 122 (e.g., a mount for the information terminal 28) in addition to the configuration of the control system shown in FIG. 1. The grip portion 121 is a portion gripped by the operator. The holding portion 122 is configured by a jig that holds the information terminal 28. The holding portion 122 holds the information terminal 28 so that the display screen of the display 114 faces the operator who grips the grip portion 121. The wireless tag communication device 10 is operated by the operator gripping the grip portion 121 with the information terminal 28 set in the holding portion 122.

The wireless tag communication device 10 continuously reads the RFID tag while being operated by the operator. For example, the operator who grips the grip portion 121 changes the position (e.g., a position of the own device) of the wireless tag communication device 10 provided with the antenna 25 and the orientation of the antenna. The wireless tag communication device 10 repeatedly reads the RFID tag while estimating the direction where the RFID tag exists (e.g., a tag direction) and the position of the own device.

The wireless tag communication device 10 estimates the direction (e.g., the tag direction) where the RFID tag exists (e.g., a direction from the wireless communication device 10 to the RFID tag) from the reading result of the RFID tag. For example, the wireless tag communication device 10 estimates the direction in which the RSSI value is maximum (e.g., the orientation of the antenna 25 or the wireless tag communication device 10 when the reading is taken) in the reading result obtained by reading a specific RFID tag as the tag direction where the RFID tag exists. Further, the wireless tag communication device 10 may estimate the median value of the range of the direction in which the specific RFID tag is read (e.g., the orientation of the antenna 25 or the wireless tag communication device 10 when the reading is taken) as the tag direction where the RFID tag exists.

The wireless tag communication device 10 estimates the position of the own device by using the self-estimation technique. In the present embodiment, the wireless tag communication device 10 estimates the position of the own device based on the image captured by the camera 29 and the information detected by the sensor 23 using the space recognition technology. For example, the wireless tag communication device 10 estimates the own position (e.g., position of the own device) by the method of self-position estimation used in augmented reality (AR) technology. However, the method and configuration for estimating the position of the own device used in the wireless tag communication device 10 are not limited to specific ones as long as the self-position can be estimated even in a room or the like.

The wireless tag communication device 10 stores the reading result obtained by reading the RFID tag set as the search target in the memory 22. If the wireless tag communication device 10 receives a response signal from a specific RFID tag, the wireless tag communication device 10 stores information such as tag information, tag direction, position of own device, RSSI value, and phase value as a reading result.

The wireless tag communication device 10 estimates the tag direction of the RFID tag to be searched and estimates the position of the own device. The wireless tag communication device 10 estimates the position where the RFID tag to be searched exists based on the estimated tag direction and the position of the own device. For example, the wireless tag communication device 10 estimates the position (e.g., tag position) of the RFID tag based on the change in the position of the own device and the tag direction estimated at each position. As a specific example, the wireless tag communication device 10 estimates the position of the RFID tag from the tag direction estimated at the first position and the tag direction estimated at the second position by using the technique of triangulation.

The wireless tag communication device 10 displays an image showing the estimated position of the RFID tag on the display 114. For example, the wireless tag communication device 10 specifies the position of the RFID tag in the image (e.g., a first image) captured by the camera 29 from the estimation result of the position of the RFID tag. The wireless tag communication device 10 displays an image (e.g., a second image) processed to clearly indicate the position of the RFID tag in the image captured by the camera 29 on the display 114 as a guidance screen.

Figure 3:
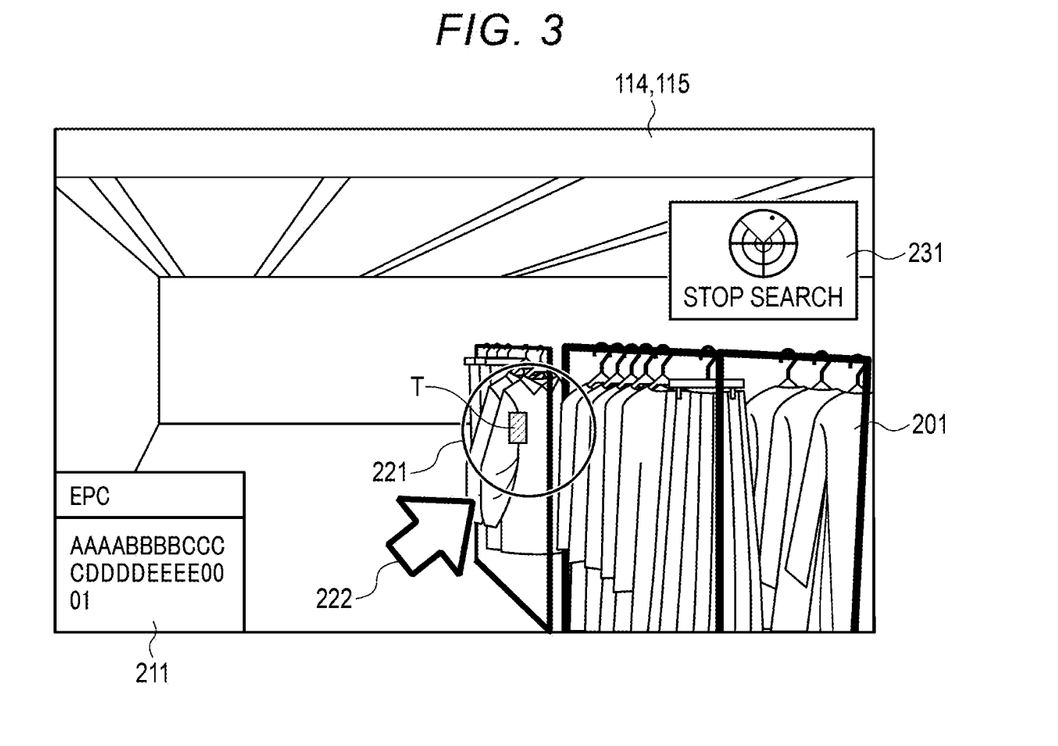
FIG. 3 is a diagram showing a first display example of a guidance screen displayed by the wireless tag communication device.

Next, the guidance screen displayed on the display 114 by the wireless tag communication device 10 according to the embodiment will be described. FIG. 3 is a diagram showing a first display example (e.g., a screenshot) of a guidance screen displayed on the display 114 by the wireless tag communication device 10. The wireless tag communication device 10 displays a guidance screen indicating the position of the RFID tag as shown in FIG. 3 on the display 114 in the search mode for searching for a specific RFID tag. The processor 21 of the wireless tag communication device 10 estimates the position (e.g., tag position) where the RFID tag to be searched exists from the tag direction estimated from the reading result of the RFID tag to be searched and the position of the own device. As a guidance screen, the processor 21 of the wireless tag communication device 10 superimposes an image (e.g., the second image) showing the estimated tag position on an image (e.g., the first image) captured by the camera 29 and displays the superimposed images on the display 114.

On the guidance screen of the first display example shown in FIG. 3, a background image 201, a position mark 221, a guidance mark 222, a display field 211, a search stop button 231, and the like are displayed. The background image 201 is an image (e.g., a first image) captured by the camera 29. For example, the background image 201 may be updated with an image captured by the camera 29 at a predetermined cycle. Further, as the background image 201, an image captured by the camera 29 if the RFID tag is read may be displayed.

The position mark 221 is a mark or visual indicator indicating a position (hereinafter, also referred to as a tag position) where the RFID tag to be searched exists (e.g., a position of the RFID tag). The position mark 221 is an example of the second image showing the area including the tag position estimated by the estimation of the tag position described later. In the first display example shown in FIG. 3, the position mark 221 is a circular mark centered on the estimated tag position.

The guidance mark 222 is a mark or visual indicator indicating a position (e.g., an estimated position) where the RFID tag to be searched exists. The guidance mark 222 is a mark for guiding the operator to the position where the RFID tag exists. The guidance mark 222 is an example of the second image showing an area including the tag position estimated by estimation of the tag position described later. In the first display example shown in FIG. 3, the guidance mark 222 is an arrow mark pointing toward the RFID tag.

The display field 211 displays information about the RFID tag to be searched. For example, the display field 211 displays the product number of the RFID tag to be searched. Further, the display field 211 may display the serial number of the RFID tag to be searched.

The search stop button 231 is a button that can be instructed by the operator on the touch panel as the input device 115. The search stop button 231 is a button for the operator to instruct to stop the search for the RFID tag. In the first display example shown in FIG. 3, the search stop button 231 also displays a guide indicating the direction where the RFID tag exists (hereinafter, also referred to as the tag direction). The guide displays a reading range of the RFID tag and a mark indicating the position of the RFID tag to be searched in a concentric circle centered on the position of the wireless tag communication device 10.

Figure 4:
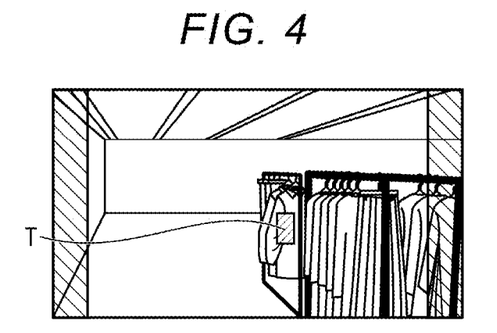
FIG. 4 is a diagram showing a second display example of the guidance screen displayed by the wireless tag communication device.
Figure 5:
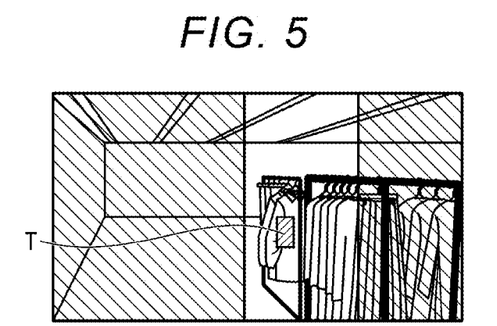
FIG. 5 is a diagram showing the second display example of the guidance screen displayed by the wireless tag communication device.
Figure 6:
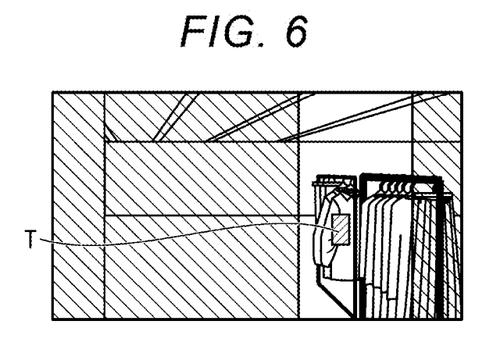
FIG. 6 is a diagram showing the second display example of the guidance screen displayed by the wireless tag communication device.

Next, a second display example of the guidance screen displayed on the display 114 by the wireless tag communication device 10 according to the embodiment will be described. FIGS. 4, 5, and 6 are diagrams showing a second display example (e.g., an alternative display configuration) of the guidance screen displayed on the display 114 by the wireless tag communication device 10. In the second display example, in the image captured by the camera 29, the area including the direction where the RFID tag exists is clearly displayed, and the other areas are displayed in an image-processed state. The image processing is, for example, mask processing. The image of the area to be image-processed (e.g., the second image) is generated by performing predetermined image processing on the image of the area in the first image.

In the second display example, the area including the direction where the RFID tag exists is referred to as an explicit area, and the other area (e.g., the area to be image-processed) is referred to as a mask area. The image of the mask area (e.g., a visual indicator) is an example of the second image. The mask processing suffices as long as the explicit area can be easily recognized intuitively. For example, the mask processing may be image processing for processing a mask area into a semi-transparent image, or image processing for blurring. Further, the mask processing may be image processing such that a bright gradation is formed centering on an explicit area including the tag direction or the tag position.

FIG. 4 is a second display example of the guidance screen displayed by the display 114 if the RFID tag T to be searched is detected (e.g., read). In the second display example shown in FIG. 4, an image (e.g., the second image) processed by using the reading range of the RFID tag T as an explicit area and the area outside the reading range as a mask area in the image captured by the camera 29 is displayed.

FIG. 5 is a second display example of the guidance screen displayed if the direction (e.g., the tag direction) where the RFID tag T to be searched exists is narrowed down relative to FIG. 4. In the second display example shown in FIG. 5, an explicit area including the estimated tag direction in the image captured by the camera 29 is set, and an image (e.g., the second image) processed by using the other area as a mask area is displayed. That is, if the wireless tag communication device 10 narrows down the tag direction, the display 114 displays (e.g., updates) a guidance screen in which the explicit area is narrowed and the mask area is enlarged. This makes it easy for the operator to intuitively recognize the area where the tag direction is narrowed down.

FIG. 6 is a second display example of the guidance screen displayed if the shooting direction of the camera 29 changes relative to FIG. 5. FIG. 6 shows an example of a guidance screen that transitions from the guidance screen as shown in FIG. 5 if the shooting direction of the camera 29 changes. The processor 21 displays an image captured by the camera 29 at a predetermined frame rate as a first image on the guidance screen. Therefore, if the shooting direction taken by the camera 29 changes in the left-right direction (e.g., shifts in the left-right direction) by the operation of the operator, the first image (e.g., the image captured by the camera 29) displayed on the guidance screen changes (e.g., shifts in the left-right direction).

If the first image whose shooting direction is changed is displayed (e.g., updated) on the guidance screen, the tag position on the guidance screen also changes. Therefore, the processor 21 updates the mask area to be displayed as the second image following the change in the shooting direction of the camera 29 displayed on the display 114.

For example, if the shooting direction of the camera 29 changes in the left-right direction, the tag direction with respect to the orientation of the antenna also changes in the left-right direction. The processor 21 changes the explicit area and the mask area on the guidance screen based on the relative position of the tag that changes according to the change in the shooting direction of the camera 29. According to such a second display example, by changing the mask area according to the change in the shooting direction of the camera 29, the explicit area including the tag direction can be displayed in an easy-to-recognize manner.

Figure 7:
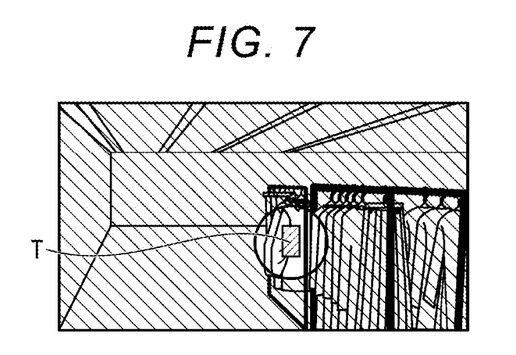
FIG. 7 is a diagram showing a third display example of the guidance screen displayed by the wireless tag communication device.
Figure 8:
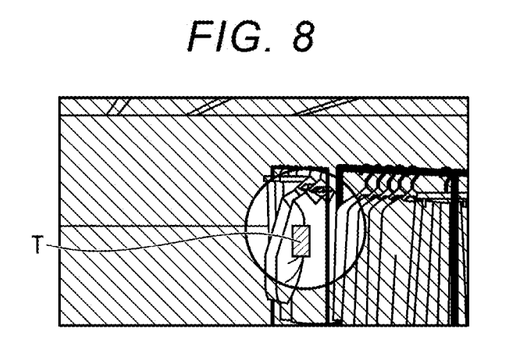
FIG. 8 is a diagram showing the third display example of the guidance screen displayed by the wireless tag communication device.
Figure 9:
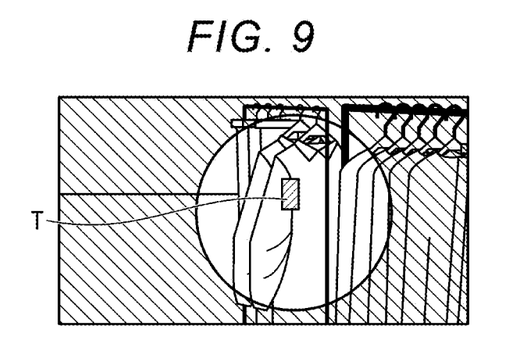
FIG. 9 is a diagram showing the third display example of the guidance screen displayed by the wireless tag communication device.

Next, a third display example of the guidance screen displayed on the display 114 by the wireless tag communication device 10 according to the embodiment will be described. FIGS. 7, 8, and 9 are diagrams showing the third display example (e.g., an alternative display configuration) of the guidance screen displayed on the display 114 by the wireless tag communication device 10. The third display example is an example of a guidance screen in which the explicit area with the position where the RFID tag T exists as the base point in the image captured by the camera 29 changes. The third display example is an example in which the second image is displayed so that the explicit area becomes larger as the distance from the RFID tag T gets closer. In the third display example, the second image is assumed to be generated by image processing (e.g., mask processing) for the mask area as described above.

FIG. 7 is a third display example of the guidance screen displayed by the display 114 if the distance from the position of the RFID tag T to be searched is a first distance. FIG. 8 is a third display example of the guidance screen displayed by the display 114 if the distance from the position of the RFID tag T to be searched is a second distance closer than the first distance. FIG. 9 is a third display example of the guidance screen displayed by the display 114 if the distance from the position of the RFID tag T to be searched is a third distance closer than the second distance.

In the guidance screen shown in FIG. 7, in the image captured by the camera 29, the explicit area with the position (e.g., the estimated position) of the RFID tag as the base point is set with a first size corresponding to the first distance. In the guidance screen shown in FIG. 8, in the image captured by the camera 29, the explicit area with the position of the RFID tag as the base point is set to a second size corresponding to the second distance. In the third display example, the second size corresponding to the second distance is larger than the first size corresponding to the first distance.

Further, the first image displayed on the guidance screen shown in FIG. 8 is an enlarged image from the first image displayed on the guidance screen shown in FIG. 7. This is because the distance between the camera 29 and the RFID tag is closer if the guidance screen shown in FIG. 8 is displayed than if the guidance screen shown in FIG. 7 is displayed. Therefore, in the guidance screen shown in FIG. 8, the image (e.g., the first image) around the RFID tag T is displayed in an enlarged state as compared with the guidance screen shown in FIG. 7 in the explicit area with the RFID tag as the base point.

In the guidance screen shown in FIG. 9, in the image captured by the camera 29, the explicit area with the position of the RFID tag T as the base point is set to a third size corresponding to the third distance. In the third display example, the third size corresponding to the third distance is larger than the second size corresponding to the second distance. Further, the image (e.g., the first image) in the explicit area displayed on the guidance screen shown in FIG. 9 is displayed as an enlarged image from the image in the explicit area displayed on the guidance screen shown in FIG. 8.

In the third display example illustrated in FIGS. 7-9, as the operator holding the wireless tag communication device approaches the target RFID tag T, the explicit area around the RFID tag T is displayed larger. As a result, the operator can move while surely checking the surroundings of the target RFID tag T as the operator approaches the target RFID tag T. As a result, the operator can easily find the target RFID tag T even if he or she is not accustomed to operating the device.

Figure 10:
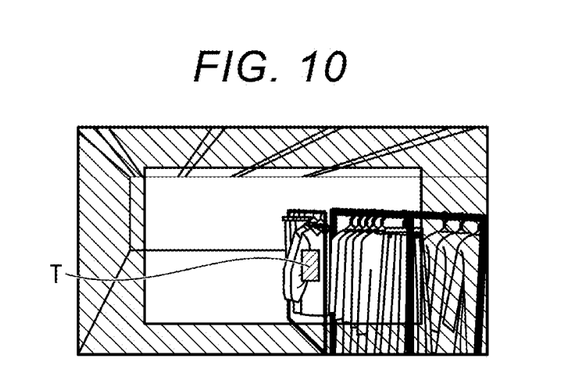
FIG. 10 is a diagram showing a fourth display example of the guidance screen displayed by the wireless tag communication device.
Figure 11:
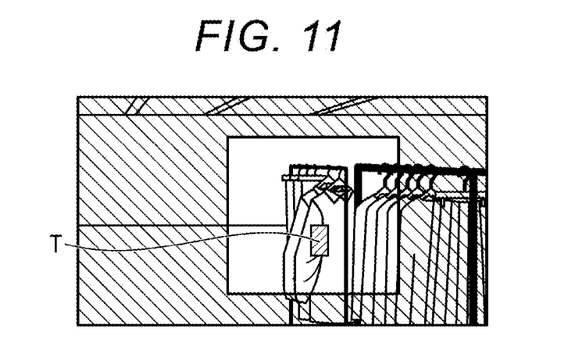
FIG. 11 is a diagram showing the fourth display example of the guidance screen displayed by the wireless tag communication device.
Figure 12:
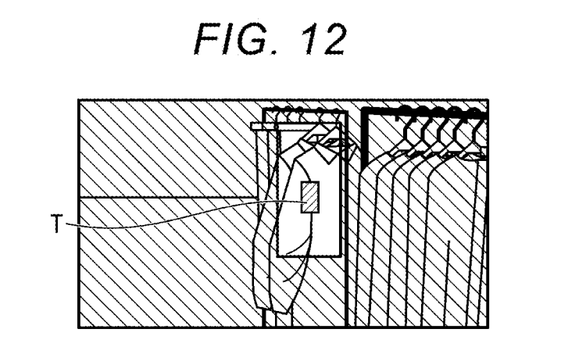
FIG. 12 is a diagram showing the fourth display example of the guidance screen displayed by the wireless tag communication device.

Next, a fourth display example of the guidance screen displayed on the display 114 by the wireless tag communication device 10 according to the embodiment will be described. FIGS. 10, 11, and 12 are diagrams showing a fourth display example of the guidance screen displayed on the display 114 by the wireless tag communication device 10. The fourth display example is another example of the guidance screen in which the explicit area with the position where the RFID tag T exists as the base point changes in the image captured by the camera 29. The fourth display example is an example in which the second image is displayed so that the explicit area becomes smaller as the distance from the RFID tag T gets closer. In the fourth display example, it is assumed that the second image is generated by the image processing (e.g., mask processing) for the mask area as described above.

FIG. 10 is a fourth display example of the guidance screen displayed by the display 114 if the distance from the position of the RFID tag T to be searched is the first distance. FIG. 11 is a fourth display example of the guidance screen displayed by the display 114 if the distance from the position of the RFID tag T to be searched is a second distance closer than the first distance. FIG. 12 is a fourth display example of the guidance screen displayed by the display 114 if the distance from the position of the RFID tag T to be searched is a third distance closer than the second distance.

In the guidance screen shown in FIG. 10, in the image captured by the camera 29, the explicit area with the position (e.g., the estimated position) of the RFID tag T as the base point is set with the first size corresponding to the first distance. In the guidance screen shown in FIG. 11, in the image captured by the camera 29, the explicit area with the position of the RFID tag T as the base point is set to the second size corresponding to the second distance. In the fourth display example, the second size corresponding to the second distance is made smaller than the first size corresponding to the first distance.

The first image displayed on the guidance screen shown in FIG. 11 is an enlarged image from the first image displayed on the guidance screen shown in FIG. 10. This is because the distance between the camera 29 and the RFID tag T is closer if the guidance screen shown in FIG. 11 is displayed than if the guidance screen shown in FIG. 10 is displayed. Therefore, in the guidance screen shown in FIG. 11, the image (e.g., the first image) around the RFID tag T enlarged as compared with the guidance screen shown in FIG. 10 is displayed in the explicit area of the second size smaller than the first size.

In the guidance screen shown in FIG. 12, in the image captured by the camera 29, the explicit area with the position of the RFID tag T as the base point is set to the third size corresponding to the third distance. In the fourth display example, the third size corresponding to the third distance is smaller than the second size corresponding to the second distance. Further, in the guidance screen shown in FIG. 12, an image enlarged from the guidance screen shown in FIG. 11 is displayed in the explicit area set smaller than the explicit area displayed on the guidance screen shown in FIG. 11.

In the fourth display example illustrated in FIGS. 10 to 12, as the operator holding the wireless tag communication device approaches the target RFID tag T, the explicit area around the RFID tag T is displayed smaller. As a result, the closer the operator approaches the target RFID tag T, the easier the operator to visually recognizes the target RFID tag T in a pinpoint manner. As a result, the operator can intuitively move the position of the RFID tag T while narrowing the position down with the guidance image, and the target RFID tag T can easily be found even if he or she is not accustomed to operating the device.

In the guidance screen of the third display example shown in FIGS. 7, 8, and 9, the explicit area is set as a circular area, but the shape of the explicit area is not limited to a specific shape. For example, the explicit area in the guidance screen of the third display example shown in FIGS. 7, 8, and 9 may be set in a shape such as a rectangle or a polygon. Further, in the guidance screens shown in FIGS. 10, 11, and 12, the explicit area is set as a rectangular area, but the shape of the explicit area is not limited to a specific shape. For example, the explicit area on the guidance screen of the fourth display example shown in FIGS. 10, 11, and 12 may be set in a shape such as a circle. Further, on the guidance screen shown in FIGS. 4 to 12, the display field 211 and the search stop button 231 as shown in FIG. 3 may be superimposed and displayed.

Figure 13:
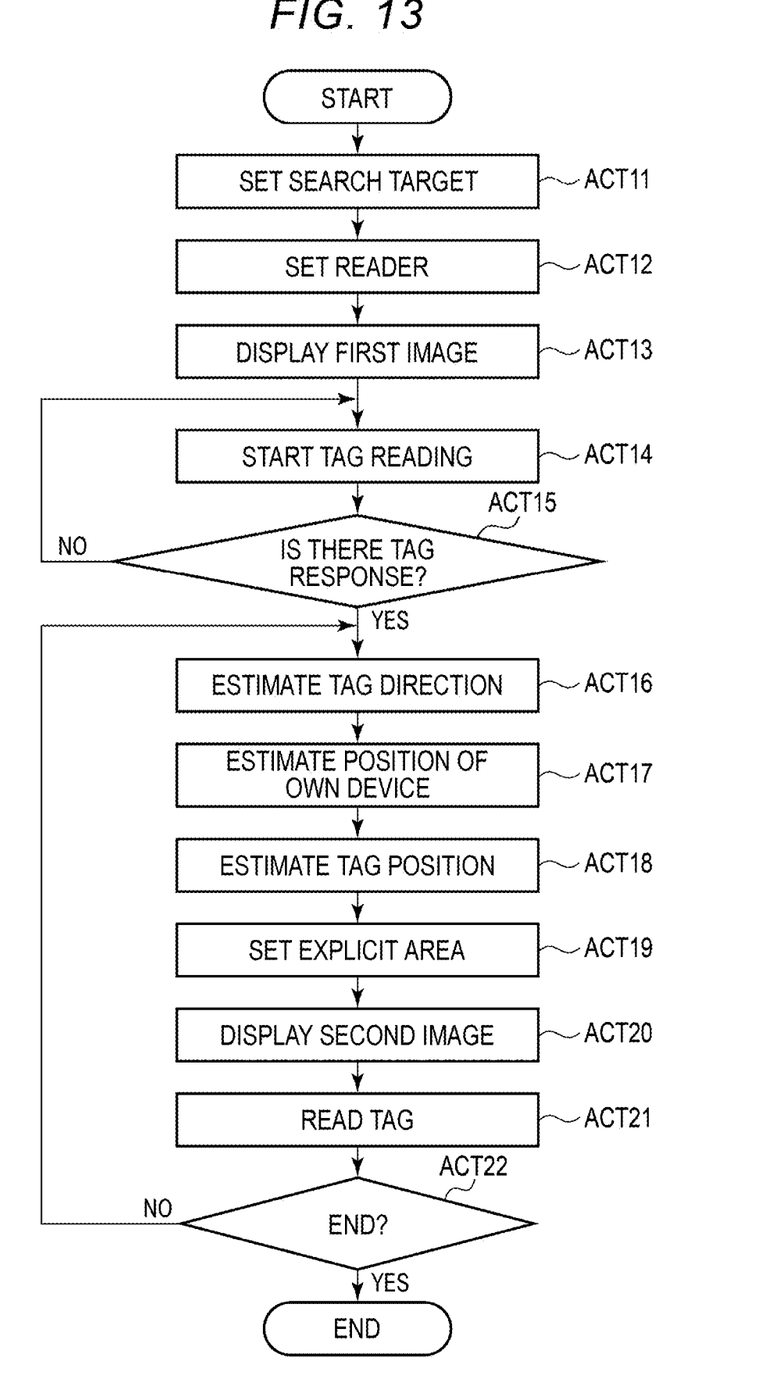
FIG. 13 is a flowchart for illustrating an operation example of the wireless tag communication device.

Next, the operation of the wireless tag communication device 10 according to the embodiment will be described. FIG. 13 is a flowchart for illustrating an operation example of the wireless tag communication device 10 according to the embodiment (e.g., a method of guiding an operator toward a wireless tag). The processor 21 of the wireless tag communication device 10 operates in the search mode by the operation of the operator. In the search mode, the processor 21 accepts the setting of the RFID tag to be searched by the operator (ACT 11). The operator uses the input device 115 or the like to designate information indicating an RFID tag to be searched. The processor 21 sets an RFID tag to be searched according to the operator's designation. Further, the processor 21 receives various setting instructions for reading the RFID tag to be searched. The operator designates an operation setting for reading the RFID tag using the input device 115 or the like, and the processor 21 performs an operation setting for reading the RFID tag according to the operator's designation (ACT 12).

The processor 21 of the wireless tag communication device 10 receives an instruction from the operator to start the search after executing the settings of the RFID tag to be searched and the operation. The processor 21 of the wireless tag communication device 10 starts the operation (e.g., search processing) as the search mode in response to the operator's instruction to start the search.

The processor 21 displays the image (e.g., the first image) captured by the camera 29 on the display 114 (ACT 13) while operating in the search mode. For example, the processor 21 displays an image to be displayed, which is captured by the camera 29 at a predetermined frame rate, on the display 114. The processor 21 causes the display 114 to display the image (e.g., the first image) captured by the camera 29 as a background image on the guidance screen.

Further, the processor 21 of the wireless tag communication device 10 executes the RFID tag reading process in response to the operator's instruction to start the search (ACT 14). For example, the processor 21 acquires a response from each RFID tag within the reading range (e.g., a communication range) of the communication control circuit 24 and the antenna 25. The processor 21 determines whether or not the response received from each RFID tag is a response from the RFID tag to be searched (ACT 15). The processor 21 determines whether or not the response from the RFID tag to be searched has been received from the response received by each RFID tag (ACT 15). If the RFID tag to be searched is not read (ACT 15, NO), the processor 21 returns to ACT 14 and repeatedly reads the RFID tag.

If the RFID tag to be searched is read (ACT 15, YES), the processor 21 starts the tag position estimation process and the second image display process according to the tag position. The wireless tag communication device 10 according to the present embodiment estimates the position of the RFID tag to be searched based on the tag direction and the position of the own device.

The processor 21 estimates the tag direction as the direction in which the RFID tag to be searched exists (ACT 16). For example, the processor 21 estimates the direction (e.g., the tag direction) in which the RFID tag to be searched exists based on the information such as the RSSI value and the phase value included in the reading result of the RFID tag. Further, the processor 21 stores the estimation result of the tag direction in the memory 22.

Further, the processor 21 estimates the current position of the wireless tag communication device as the position of its own device (ACT 17). For example, the processor 21 estimates the position of its own device from the image captured by the camera 29 and the detection result of the sensor 23 by using the space recognition technology. Further, the processor 21 stores the estimation result of the position of the own device in the memory 22 in association with the estimation result of the tag direction.

After estimating the tag direction and the position of the own device, the processor 21 estimates the tag position as the position where the RFID tag to be searched exists (ACT 18). The processor 21 estimates the tag position based on the estimated tag direction and the position of the own device. For example, the processor 21 estimates the position where the RFID tag exists based on the plurality of positions (e.g., estimated positions) of the own device obtained in time series and the tag direction at each estimated position.

The processor 21 sets an explicit area including the tag position based on the estimation result of the tag position (ACT 19). The processor 21 specifies the tag position in the image (e.g., the first image) captured by the camera 29 based on the estimation result of the tag position. Here, the processor 21 determines the size and shape of the explicit area with the tag position as the base point (e.g., an explicit area containing the tag position). For example, the processor 21 may determine the size and shape of the explicit area according to the distance between the position of the own device and the tag position. As a result, the processor 21 sets an explicit area with the tag position specified in the first image as the base point.

If the explicit area in the first image is set, the processor 21 displays a second image showing the explicit area in the first image displayed on the display 114 (ACT 20). For example, the processor 21 generates a second image showing the set explicit area every time the explicit area is set (e.g., updated). The second image showing the explicit area (e.g., a visual indicator) may be marks 221 and 222 as shown in FIG. 3 or may be an image of the mask area shown in FIGS. 4 to 13.

The processor 21 updates the guidance screen displayed on the display 114 by superimposing the second image generated on the image (e.g., the first image) captured by the camera 29 and displaying the superimposed image. For example, the processor 21 displays an image (e.g., the first image) captured by the camera 29 in real-time and superimposes and displays a second image generated based on the estimation result of the tag position.

If the guidance screen displayed on the display 114 is updated, the processor 21 re-executes the reading process of reading the RFID tag to be searched (ACT 21). Here, if the processor 21 is instructed to end or stop the search process (ACT 22, NO), the processor 21 ends the series of search processes.

If the RFID tag reading is executed, the processor 21 proceeds to ACT 16 and repeats the above-described processes unless there is an instruction to end the search (ACT 22, NO). As a result, the processor 21 repeatedly executes the estimation of the tag position and repeats the process of displaying the guidance screen indicating the tag position in the explicit area based on the estimation result of the tag position. As a result, the display 114 displays the first image captured by the camera and the second image indicating the tag position updated with the movement of the own device in an explicit area.

As described above, the wireless tag communication device according to the embodiment includes a communication device, a camera, a sensor, and a processor. The communication device communicates with a target wireless tag using a directional antenna. The camera captures an image with the directivity maximum direction of the directional antenna as the shooting direction. The processor detects the direction of the target wireless tag. The processor detects the position of its own device using the image captured by the camera. The processor calculates the estimated position of the target wireless tag using the detection result of the direction of the target wireless tag and the detection result of the position of the own device. The processor displays a guidance screen showing the estimated position of the target wireless tag on the display. Thereby, the wireless tag communication device according to the embodiment can provide a guidance screen with which the position of the RFID tag to be searched is intuitively easy to understand.

Further, in the wireless tag communication device according to the embodiment, the processor changes the setting of the explicit area for clearly indicating the image around the estimated position according to the distance between the position of the own device and the estimated position of the target wireless tag. Thereby, the wireless tag communication device according to the embodiment can clearly indicate the image around the RFID tag to be searched and provide guidance for intuitively knowing the position of the RFID tag to be searched.

In the above-described embodiment, the case where the program executed by the processor is stored in advance in the memory in the device was described. However, the program executed by the processor may be downloaded from the network to the device or installed from the storage medium to the device. The storage medium may be any storage medium that can store a program, such as a CD-ROM, and can be read by the device. Further, the functions obtained by installation or download in advance may be implemented in cooperation with an operating system (OS) or the like inside the device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication device comprising:
a directional antenna;
a communication control circuit configured to communicate with a wireless tag through the directional antenna;
a camera positioned such that a direction along which a signal strength of the directional antenna is maximized and a shooting direction of the camera coincide with each other; and
a controller configured to:
estimate a tag direction where the wireless tag exists;
estimate a position of the wireless tag communication device;
estimate a position of the wireless tag based on the estimated tag direction and the estimated position of the wireless tag communication device;
control a display to display a first image captured by the camera and a second image showing an explicit area containing the estimated position of the wireless tag;
determine whether a decrease in a distance between the estimated position of the wireless tag and the estimated position of the wireless tag communication device has occurred; and
increase a size of the explicit area in response to a determination that the decrease in the distance has occurred.

2. The wireless tag communication device of claim 1, wherein the controller is configured to control the display to display the second image superimposed on the first image.

3. The wireless tag communication device of claim 2, wherein the controller is configured to:
continuously estimate the tag direction and the position of the wireless tag communication device; and
estimate the position of the wireless tag based on both (a) a first estimated tag direction corresponding to a first estimated position of the wireless tag communication device and (b) a second estimated tag direction corresponding to a second position of the wireless tag communication device.

4. The wireless tag communication device of claim 1, wherein the controller is configured to estimate the position of the wireless tag communication device based on the first image captured by the camera.

5. The wireless tag communication device of claim 4, wherein the controller is configured to estimate the position of the wireless tag communication device based on the first image captured by the camera and a detection signal provided by a sensor that detects a movement of the wireless tag communication device.

6. The wireless tag communication device of claim 1, wherein the controller is configured to estimate the position of the wireless tag communication device based on a detection signal provided by a sensor that detects a movement of the wireless tag communication device.

7. The wireless tag communication device of claim 1, wherein the second image is an image obtained by masking an area of the first image other than the explicit area.

8. The wireless tag communication device of claim 1, wherein the controller is configured to shift the explicit area in response to a change in the estimated position of the wireless tag communication device.

9. The wireless tag communication device of claim 1, wherein the controller is configured to control the display to display the second image superimposed on the first image, and wherein the second image is an image obtained by masking an area of the first image outside of the explicit area.

10. The wireless tag communication device of claim 9, wherein the controller is configured to shift the explicit area in response to a change in the estimated position of the wireless tag communication device.

11. The wireless tag communication device of claim 1, wherein the controller is configured to control the display to display the first image without displaying the second image in response to a determination that the communication control circuit is not communicating with the wireless tag.

12. The wireless tag communication device of claim 1, wherein the controller is configured to decrease the size of the explicit area in response to a determination that an increase in the distance between the estimated position of the wireless tag and the estimated position of the wireless tag communication device has occurred.

13. A wireless tag communication device comprising:
a directional antenna;
a communication control circuit configured to communicate with a wireless tag through the directional antenna;
a camera positioned to capture an image including an area in which a signal strength of the directional antenna is maximized; and
a controller configured to:
estimate a tag direction from the wireless tag communication device to the wireless tag;
estimate a position of the wireless tag communication device;

estimate a position of the wireless tag based on the estimated tag direction and the estimated position of the wireless tag communication device;

control a display to display an indicator showing an explicit area containing the estimated position of the wireless tag superimposed on the image captured by the camera; and at least one of:

increase a size of the explicit area in response to a decrease in a distance between the estimated position of the wireless tag and the estimated position of the wireless tag communication device; or decrease the size of the explicit area in response to an increase in the distance between the estimated position of the wireless tag and the estimated position of the wireless tag communication device.

14. The wireless tag communication device of claim 13, wherein the controller is configured to estimate the position of the wireless tag communication device based on the image captured by the camera and a detection signal provided by a sensor that detects a movement of the wireless tag communication device.

15. The wireless tag communication device of claim 13, wherein the controller is configured to:

continuously estimate the tag direction and the position of the wireless tag communication device; and estimate the position of the wireless tag based on both (a) a first estimated tag direction corresponding to a first estimated position of the wireless tag communication device and (b) a second estimated tag direction corresponding to a second position of the wireless tag communication device.

16. The wireless tag communication device of claim 13, wherein the indicator masks a portion of the image outside of the explicit area.

17. The wireless tag communication device of claim 13, wherein the controller is configured to shift the indicator in response to a change in the estimated position of the wireless tag communication device.

18. The wireless tag communication device of claim 13, wherein the controller is configured to increase the size of the explicit area in response to the decrease in the distance between the estimated position of the wireless tag and the estimated position of the wireless tag communication device.

19. A method of operating a wireless tag communication device to guide an operator toward a wireless tag, the method comprising:

communicating with the wireless tag through a directional antenna;

capturing, by a camera, a first image along a shooting direction, the shooting direction coinciding with a direction along which a signal strength of the directional antenna is maximized;

estimating a tag direction where the wireless tag exists;

estimating a position of the wireless tag communication device;

estimating a position of the wireless tag based on the estimated tag direction and the estimated position of the wireless tag communication device;

displaying, by a display, the first image captured by the camera and a second image showing an explicit area containing the estimated position of the wireless tag, the second image being superimposed on the first image; and increasing a size of the explicit area in response to a determination that a distance between the estimated position of the wireless tag and the estimated position of the wireless tag communication device has decreased.

20. The method of claim 19, further comprising decreasing the size of the explicit area in response to a determination that the distance between the estimated position of the wireless tag and the estimated position of the wireless tag communication device has increased.

\* \* \* \* \*